United States Patent
Zhang et al.

(10) Patent No.: US 12,158,647 B2
(45) Date of Patent: Dec. 3, 2024

(54) PRE-ASSEMBLY ELECTRICALLY CONTROLLABLE FUNCTIONAL ELEMENT WITH PROTECTIVE FILM

(71) Applicant: SAINT-GOBAIN GLASS FRANCE, Courbevoie (FR)

(72) Inventors: Huixing Zhang, Aachen (DE); Florian Manz, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 346 days.

(21) Appl. No.: 17/421,126

(22) PCT Filed: Dec. 12, 2019

(86) PCT No.: PCT/EP2019/084787
§ 371 (c)(1),
(2) Date: Jul. 7, 2021

(87) PCT Pub. No.: WO2020/143984
PCT Pub. Date: Jul. 16, 2020

(65) Prior Publication Data
US 2022/0072828 A1  Mar. 10, 2022

(30) Foreign Application Priority Data

Jan. 7, 2019  (EP) .................................... 19150484

(51) Int. Cl.
*G02F 1/1333* (2006.01)
*G02F 1/1362* (2006.01)
*B32B 17/10* (2006.01)

(52) U.S. Cl.
CPC .. *G02F 1/133368* (2021.01); *G02F 1/133305* (2013.01); *G02F 1/136277* (2013.01);
(Continued)

(58) Field of Classification Search
None
See application file for complete search history.

(56) References Cited

U.S. PATENT DOCUMENTS 5,408,353 A * 4/1995 Nichols ............... G02F 1/13439
359/260
7,236,292 B2 * 6/2007 LeCain ................. G02F 1/1339
359/296
(Continued)

FOREIGN PATENT DOCUMENTS

CN  101454154 A  6/2009
CN  104520097 A  4/2015
(Continued)

OTHER PUBLICATIONS

International Search Report as issued in International Patent Application No. PCT/EP2019/084787, dated Feb. 17, 2020.

*Primary Examiner* — Dung T Nguyen
(74) *Attorney, Agent, or Firm* — Pillsbury Winthrop Shaw Pittman LLP (57) ABSTRACT

A pre-assembly functional element with electrically controllable optical properties, includes a multilayer film, which includes, in this order, a first protective film, a first carrier film, a first flat electrode, an active layer, a second flat electrode, a second carrier film, and a second protective film, wherein the first protective film and the second protective film are in each case independently selected from a PVB film, an EVA film, or a TPU film. The functional element also includes one or more sealing films that are attached to the multilayer film.

22 Claims, 4 Drawing Sheets (52) U.S. Cl.
CPC ... *B32B 17/10036* (2013.01); *B32B 17/10211* (2013.01); *B32B 17/10504* (2013.01); *B32B 17/10532* (2013.01); *B32B 17/1055* (2013.01); *B32B 17/10871* (2013.01); *B32B 2307/202* (2013.01); *B32B 2307/732* (2013.01); *B32B 2605/006* (2013.01)

(56) References Cited

U.S. PATENT DOCUMENTS

| | | |
|---|---|---|
| 2009/0176101 A1 | 7/2009 | Greenall |
| 2010/0098886 A1* | 4/2010 | Fong ................ B32B 27/08 428/1.6 |
| 2012/0307337 A1* | 12/2012 | Bartug ............... C03C 17/3681 359/245 |

FOREIGN PATENT DOCUMENTS

| | | |
|---|---|---|
| CN | 104768892 A | 7/2015 |
| CN | 104837625 A | 8/2015 |
| CN | 105425498 A | 3/2016 |
| CN | 107614302 A | 1/2018 |
| CN | 107980024 A | 5/2018 |
| DE | 10 2008 026339 A1 | 12/2009 |
| EP | 0 876 608 B1 | 4/2002 |
| WO | WO 2010/032068 A1 | 3/2010 |
| WO | WO 2011/033313 A1 | 3/2011 |
| WO | WO 2012/154663 A1 | 11/2012 |
| WO | WO 2014/023475 A1 | 2/2014 |
| WO | WO 2017/157626 A1 | 9/2017 |
| WO | WO 2018/082920 A1 | 5/2018 |
| WO | WO 2018/188844 A1 | 10/2018 |

\* cited by examiner

PRE-ASSEMBLY ELECTRICALLY CONTROLLABLE FUNCTIONAL ELEMENT WITH PROTECTIVE FILM

CROSS-REFERENCE TO RELATED APPLICATIONS

This application is the U.S. National Stage of PCT/EP2019/084787, filed Dec. 12, 2019, which in turn claims priority to European patent application number 19 150 484.4 filed Jan. 7, 2019. The content of these applications are incorporated herein by reference in their entireties.

The invention relates to a pre-assembly functional element with electrically controllable optical properties, a method for producing a composite pane with electrically controllable optical properties, in which pane the functional element is installed, and the use of the functional element.

Composite panes with electrically controllable functional elements are known per se. The optical properties of the functional elements can be changed by an applied electrical voltage.

SPD functional elements (SPD=suspended particle device), known, for example, from EP 0876608 B1 and WO 2011033313 A1, are one example of such functional elements. The transmittance of visible light through SPD functional elements can be controlled by the applied voltage.

PDLC functional elements (PDLC=polymer dispersed liquid crystal), known, for example, from DE 102008026339 A1, are another example. The active layer contains liquid crystals that are embedded in a polymer matrix. When no voltage is applied, the liquid crystals are aligned in a disorderly manner, resulting in strong scattering of the light passing through the active layer. When a voltage is applied to the flat electrodes, the liquid crystals align themselves in a common direction and the transmittance of light through the active layer is increased.

PNLC functional elements (PNLC=polymer network liquid crystal) are another example. The active layer contains liquid crystals that are embedded in a polymer network, with the functionality otherwise analogous to that with the PDLC functional elements.

SPD, PDLC, and PNLC functional elements are commercially available as multilayer film, wherein the active layer and the flat electrodes necessary for applying a voltage are arranged between two carrier films, typically made of PET. During production of the composite pane, the functional element is cut from the multilayer film in the desired size and shape and placed between the films of an intermediate layer, by means of which two glass panes are laminated to one another to form the composite pane. The side edge of the functional element is open such that the active layer makes contact via the side edge with other material of the composite pane, e.g., from the intermediate layer, which can result in functional and optical interference.

Polyvinyl butyral (PVB) that contains plasticizer is, for example, often used for the intermediate layer. The plasticizer or other chemical components of the intermediate layer can diffuse into the active layer via the open edge of the functional element, which can result in corrosion or degradation of the active layer. This manifests itself in particular as loss or change in color of the active layer in the edge region, which can adversely affect the function and the visual appearance of the functional element. In PDLC for buildings, ethylene vinyl acetate, in which the defects are less pronounced, is also used for the intermediate layer.

WO 2012154663 A1 and WO 2014023475 A1 propose sealing the edge of the functional element with a polymeric tape, preferably made of polyimide, to avoid impairment of the active layer. However, if the relevant side edge of the functional element is visible when looking through the composite pane, this solution has the disadvantage that the tape is possibly visually perceptible, which is also not very appealing aesthetically. Moreover, this also requires additional processing steps. In each case, these documents disclose functional elements that have an adhesive film on both sides in the assembled state. In the pre-assembly state, the functional elements have no adhesive films.

Functional elements commercially available as a multilayer film, such as current PDLC films, are covered on both sides with a protective film made of polypropylene or polyethylene. The protective film serves, in particular, to protect the carrier film against soiling or scratching. During the lamination procedure to form a composite pane, the protective film must be removed prior to lamination. However, during lamination the protective film is sometimes inadvertently not removed, which affects the properties of the glazing. Primarily affected are the adhesion and thickness, but the optical properties (transmittance and reflection) can also be easily changed.

When properly handled, the protective film must be removed from the functional element and the functional element freed of the protective film must then be brought, together with bonding films, into an arrangement with the panes. The many steps are labor-intensive and there is thus an increased risk of soiling of the functional element. The subsequent cleaning of the functional element can result in additional defects. If the defects are not detected, such contamination can be found again in the transparent region of the finished laminated pane and is, consequently, responsible for increased rejects. Optionally, additional steps can also be required to seal the side edge of the functional element.

The object of the present invention is to provide a functional element having electrically controllable optical properties that overcomes the above-described disadvantages of the prior art. In particular, the object of the invention consists in providing a functional element having electrically controllable optical properties with which additional steps required for removing protective films are saved and an efficient production method for composite panes that contain such a functional element with electrically controllable optical properties can be provided. Moreover, an optionally desired or required sealing of the side edge of the functional element in a simplified manner should also be possible.

The inventors found that this object can be accomplished by replacing the previously customary protective films for functional elements with protective films made of a specific thermoplastic material that can be laminated directly into the composite panes.

The object of the present invention is, consequently, accomplished by a functional element in accordance with the independent claim 1. The invention also relates to a method for producing a composite pane having electrically controllable optical properties with the incorporated functional element and to the use of the functional element in accordance with the further coordinate claims. Preferred embodiments are apparent from the dependent claims.

For example, the functional element according to the invention, in which the customary protective films, made, for example, of PE or PP are replaced, yields the following advantages.

The protective film can be directly laminated into a glazing, thus saving time during lamination. Prior removal of the protective film is not required. The protective film can serve simultaneously as a bonding film or a laminating film.

The lamination process is simplified. Fewer processing steps are required with the functional element such that unintentional inclusions can be avoided, in particular in the visible regions, and processing time is shortened. Overall, the result and the efficiency in the production of composite panes having a functional element are improved.

The functional element is protected by the protective film used according to the invention. Possible scratches on the surface of the protective film disappear during lamination. The protective film used according to the invention is several times thicker than the films conventionally used, as a result of which even deeper scratches can be compensated. Point-wise pressure commonly increases the risk of "dents". These can be subsequently found in slightly different optical properties in the end product. This problem is also mitigated by the present invention.

The inventors also found that films suitable for sealing the side edge of the functional element can be fixed directly between the protective film and the carrier film in a simple manner. This reduces the labor required for assembly when such a seal is to be incorporated. Also, no adhesive or adhesive layers are required to fix the seal.

The invention is explained in more detail in the following. The invention relates in particular to the functional element in non-installed or unassembled state, i.e., the functional element per se, the use of the functional element, and a method for incorporation of the functional element into a composite pane. The invention thus relates to a pre-assembly (prefabricated or ready-made) functional element that is not yet installed in a composite pane and already has, in the pre-assembly state, two protective films that serve as protective films in the prefabricated functional element and as laminating layers (laminating films) during lamination of the composite pane. The prefabricated functional element can thus be laminated into a composite pane without needing additional laminating films for lamination of the composite pane.

In accordance with the invention, afunctional element having electrically controllable optical properties is provided that comprises a multilayer film, comprising, in this order, a first protective film, a first carrier film, a first flat electrode, an active layer, a second flat electrode, a second carrier film, and a second protective film, wherein the first protective film and the second protective film are in each case independently selected from a polyvinyl butyral (PVB) film, an ethylene vinyl acetate (EVA) film, or a thermoplastic polyurethane (TPU) film.

The functional element includes a multilayer film. The functional element can, optionally, consist only of this multilayer film. The multilayer film is, in particular, formed from a plurality of layers or films bonded to one another.

The multilayer film includes an active layer. Active layers are known to the person skilled in the art. The active layer has variable optical properties that can be controlled by an electrical voltage applied to the active layer. In the context of the invention, the term "electrically controllable optical properties" means, in particular, properties that are continuously controllable, but also properties that can be switched between two or more discrete states. Said optical properties relate, in particular, to transmittance of light and/or to scattering behavior.

The multilayer film further includes flat electrodes for applying voltage to the active layer, which are arranged between the carrier films and the active layer. A first flat electrode is arranged between the active layer and the first carrier film and a second flat electrode is arranged between the active layer and the second carrier film. The flat electrodes can be the same or different in terms of composition and/or thickness. The flat electrodes are usually the same.

The flat electrodes are preferably designed as transparent electrically conductive layers. The flat electrodes preferably contain at least a metal, a metal alloy, or a transparent conducting oxide (TCO). Examples of transparent conducting oxides (TCO) are tin-doped indium oxide (ITO, also referred to as indium tin oxide), tin oxide doped with antimony or fluorine ($SnO_2$:Sb, $SnO_2$:F), gallium-doped zinc oxide (ZnO:Ga), or aluminum-doped zinc oxide (ZnO:Al), with ITO being preferred. The thickness of the electrically conductive layers based on these transparent conducting oxides (TCO) is preferably in the range from 10 nm to 2 μm, more preferably in the range from 30 nm to 500 nm, and in particular in the range from 50 to 100 nm.

The electrically conductive layer can also be a metal layer, preferably a thin layer or a stack of thin layers that include metal layers. Here, metal also includes metal alloys. Suitable metals are, for example, Ag, Al, Pd, Cu, Pd, Pt, In, Mo, Au, Ni, Cr, W, or alloys thereof. These metal coatings are referred to as TCC (transparent conductive coatings). Typical thicknesses of the individual layers are in the range from 2 to 50 nm.

Typically, the flat electrodes are implemented in the form of an electrically conductive coating on the carrier film. The side of the carrier film with the electrically conductive coating forming the flat electrode then faces the active layer in the multilayer film.

The multilayer film also includes a first carrier film, which is arranged between the first protective film and the flat electrode nearest the first carrier film, and a second carrier film, which is arranged between the second protective film and the flat electrode nearest the second carrier film.

The first and second carrier films are, in particular, thermoplastic films. The first and second carrier film can be the same or different in terms of composition and/or thickness. Typically, the two carrier films have the same composition. The following indications concerning carrier films refer both to the first carrier film and to the second carrier film.

The carrier films contain or consist of a thermoplastic material. The thermoplastic material can be a thermoplastic polymer or a mixture of two or more thermoplastic polymers. In addition to the thermoplastic material, the carrier film can also contain additives, such as plasticizers. The thermoplastic material of the carrier films is preferably polyethylene terephthalate (PET), as is customary in commercially available functional elements.

The thermoplastic material of the carrier film can also contain or consist of mixtures of PET with other thermoplastic polymers and/or copolymers of PET. The thermoplastic material of the carrier film can, for example, also contain or consist of PU, polypropylene, polycarbonate, polymethyl methacrylate, polyacrylate, polyvinyl chloride, polyacetate resin, fluorinated ethylene propylene, polyvinyl fluoride, and/or ethylene tetrafluoroethylene.

The first carrier film and the second carrier film are preferably selected, independently in each case, from a polyethylene terephthalate (PET) film. In addition to the thermoplastic polymer PET, the PET film can also, optionally, contain additives, such as plasticizers and/or coloring agents, or, optionally, one or more additional thermoplastic polymers, such as those described above. One or more coloring agents are particularly advantageous because, then, the scattered light is quickly absorbed. This improves the optical properties (reduced rainbow effect). Additional thermoplastic polymers are generally not preferred. However, if one or more additional thermoplastic polymers are included, their total content is less than that of the main thermoplastic polymer PET, e.g., less than 20 wt.-%, preferably less than 10 wt.-%, based on the total thermoplastic material in the PET film.

The thickness of each carrier film is preferably in the range from 0.03 mm to 0.4 mm, more preferably in the range from 0.04 mm to 0.2 mm.

The multilayer film also includes a first protective film, which is arranged over the first carrier film, i.e., on the side of the first carrier film facing away from the active layer, and a second protective film, which is arranged over the second carrier film, i.e., on the side of the second carrier film facing away from the active layer.

The first protective film and the second protective film preferably form the two outer surfaces of the multilayer film. The functional element, in particular the carrier films, are advantageously protected by the protective films against damage, such as scratching.

The first protective film and the second protective film are in each case independently selected from a polyvinyl butyral (PVB) film, an ethylene vinyl acetate (EVA) film, or a thermoplastic polyurethane (TPU) film. The first and second protective film can be the same or different in terms of composition and/or thickness. The following indications concerning protective films refer both to the first protective film and to the second protective film.

The protective films serve not only to protect the functional element, but also to bond or laminate the composite pane during production of composite panes, in order to join the two panes. The protective films thus have a dual function. On the one hand, they protect the functional element in the non-installed state, and, on the other, during production of a composite pane, they form a bonding layer for joining the components of the composite pane.

The first and second protective films are, in particular, thermoplastic films. The protective films selected from among a polyvinyl butyral (PVB) film, an ethylene vinyl acetate (EVA) film, or a thermoplastic polyurethane (TPU) film contain or consist of PVB, EVA, or TPU as a thermoplastic polymer. In addition to the thermoplastic polymer, the protective film can also, optionally, contain additives, such as plasticizers, UV absorbers, IR absorbers, or, optionally, one or more additional thermoplastic polymers. Additional thermoplastic polymers are generally not preferred. However, if one or more additional thermoplastic polymers are included, their total content is less than that of the main thermoplastic polymer (PVB, EVA, or TPU), e.g., less than 20 wt.-%, preferably less than 10 wt.-%, based on the total thermoplastic material in the protective film.

Polyvinyl butyral (PVB) films, ethylene vinyl acetate (EVA) films, and thermoplastic polyurethane (TPU) films are used, among others, as bonding films or laminating films and are available commercially in a large variety of variants.

The first protective film and/or the second protective film are preferably a PVB film; preferably, both protective films are PVB films. The protective films, in particular the PVB films, can contain a plasticizer or be plasticizer-free. Since the protective films are preferably used thin, plasticizer-free protective films also have processing flexibility comparable to that of thick, plasticizer-containing films. The protective films, in particular the PVB films, are preferably plasticizer-free. Suitable plasticizer-free PVB films are, for example, Movital® films, available from von Kuraray. Plasticizer-free films are generally less expensive than plasticizer-containing films. A further advantage is that no plasticizer can diffuse out, which can adversely affect the quality of the composite pane, in particular when the side edge of the functional element is not sealed.

The first protective film and the second protective film preferably have, independently in each case, a thickness in the range from 0.03 mm to 0.9 mm, particularly preferably 0.3 mm to 0.6 mm, preferably being PVB films. For example, customary PVB films with a thickness of 0.38 mm are suitable. So-called acoustic films have, for example, a thickness of 0.52 mm or 0.82 mm. In this respect, the first protective film and the second protective film have, even more preferably, independently in each case, a thickness in the range from 0.3 mm to 0.5 mm or, when it is an acoustic film, in the range from 0.5 to 0.9 mm.

Since the protective films of the functional elements according to the invention remain in a composite pane when installed, they can also assume optical or other functions in the composite pane. This is known with the use of conventional bonding films. The first protective film and the second protective film can, independently in each case, be selected from among a clear film, a tinted film, and an acoustic film, with the first and second protective film preferably being a PVB film. Acoustic films are, for example, composed of multiple, e.g., three, PVB films, with a softer PVB film included in the middle. For example, two tinted PVB films or one tinted PVB film and one clear PVB film can be used as protective films to achieve certain optical effects.

In a preferred embodiment, the outward facing sides of the protective films are roughened to facilitate deaeration during lamination. This is advantageous in particular with the use of PVB films as bonding films.

In a preferred embodiment, the functional element is a PDLC functional element, a PNLC functional element, or an SPD functional element. The modes of operation of functional elements are known per se to the person skilled in the art.

The active layer of a PDLC functional elements contains liquid crystals that are embedded in a polymeric matrix. When no voltage is applied to the flat electrodes, the liquid crystals are aligned in a disordered manner, resulting in strong scattering of the light passing through the active layer. When a voltage is applied to the flat electrodes, the liquid crystals align themselves in a common direction and the transmittance of light through the active layer is increased.

The active layer of a PNLC functional element contains liquid crystals that are embedded in a polymeric network. Otherwise, the functional principle is similar to that of the PDLC functional element.

The active layerof an SPD functional element contains suspended particles, wherein the absorption of light by the active layer can be changed by application of a voltage to the flat electrodes. By applying voltage, for example, a dark blue pane can become a transparent pane.

The functional element can be provided as a laminated multilayer film that can advantageously be incorporated into a composite pane. The functional element can be rolled material, e.g., with a width of 0.8 m to 2 m and a length of up to 200 m or more. Pieces of suitable size can be cut from the rolled material as needed. The area of the suitably cut functional element according to the invention can vary widely and thus be adapted to the requirements in the individual case. The area of the functional element is, for example, from 100 cm$^2$ to 20 m$^2$, with an area of 400 cm$^2$ to 6 m$^2$ preferred, as is common for the production of glazings of vehicles and of structural and architectural glazings. The thickness of the functional element without the two protective films is, for example, from 0.09 mm to 0.8 mm, e.g., 0.11 to 0.41 mm. A functional element of suitable size and shape can be cut from a larger functional element.

As already mentioned, it can be expedient or necessary to partially or completely seal the side edge of the functional element incorporated into a composite pane. For example, PVB can react with the active layer of the functional element during the lamination process (high temperature and pressure).

The inventors found that additional sealing films, which are suitable for the edge sealing of the functional element in the composite pane, can be fixed directly and simply to the pre-assembly functional element, by detaching the protective film from the carrier film in an edge region of the functional element and folding it back; and after inserting part of the sealing film, placing the folded-back protective film again on the inserted part of the sealing film. In this way, a part of the sealing film is positioned between the protective film and the carrier film, while the other part protrudes out of the multilayer film. As a result, the labor for assembly for a seal can be reduced.

Depending on requirements, one or more sealing films can be fixed in this way to the pre-assembly functional element. The one or more sealing films are selected from among PET films or polyimide films, with PET films being significantly more advantageous. Polyimide films are not quite as effective but are transparent yellow and thus clearly visible. Whereas polyimide reduces diffusion, the seal with PET is essentially complete, such that with it, diffusion defects are avoided.

PET films have already been described above as a possible film for the carrier film. Reference is made to the relevant description. Polyimide films are also common commercially available films.

In a preferred embodiment, the pre-assembly functional element consequently includes one or more sealing films, which are in each case independently selected from a polyethylene terephthalate (PET) film or a polyimide film, wherein each sealing film is attached or fixed to the multilayer film, in that a part of the sealing film is arranged along an edge region of the multilayer film between the first protective film and the first carrier film or between the second protective film and the second carrier film; and the other part of the sealing film protrudes out of the multilayer film.

One advantage of the invention consists, among other things, in that for the attachment of the sealing films or for the subsequently occurring sealing in the composite pane, no adhesives or adhesive layers are required for the fixing. For example, the sealing film does not need to have an adhesive layer.

One or two sealing films can be attached along the edge region of the multilayer film of the pre-assembly functional element. The attachment of two sealing films is described below. While one sealing film can suffice for a seal, it is preferred for two sealing films to be attached along an edge region of the multilayer film when no bus bar is positioned along the edge region. When a bus bar is positioned along the edge region in question, a sealing film generally suffices there; however, the use of two sealing films is also possible.

Consequently, in another preferred embodiment, two sealing films are in each case attached on one or more sides of the multilayer film of the pre-assembly functional element, in that along an edge region of the respective side, a part of the one sealing film is arranged between the first protective film and the first carrier film and the other part of the sealing film protrudes out of the multilayer film and a part of the other sealing film is arranged between the second protective film and the second carrier film and the other part of the sealing film protrudes out of the multilayer film.

The following description is based on the attachment of one or two sealing films along an edge region of the multilayer film and the attachment methods described above, unless otherwise indicated.

Generally, when a functional element is incorporated into composite panes, bus bars, via which the contact to the electrical power supply and distribution of the electrical current to the functional element is done, are also arranged. To connect the bus bars to the functional element, a specific configuration is required, which is usually obtained by appropriate processing of the multilayer film of the functional element. Bus bars are known to the person skilled in the art.

The functional element preferably includes at least two bus bars, which are arranged or installed along a first edge region and a second edge region of the multilayer film. Each flat electrode is electrically conductively connected to at least one bus bar.

The at least two bus bars are, in particular, arranged in the following manner. Along a first edge region of the multilayer film, the first carrier film, the first flat electrode situated between the first carrier film and the active layer, and the active layer are recessed such that the second flat electrode situated between the second carrier film and the active layer, the second carrier film, and the second protective film protrude, with a bus bar arranged on the protruding flat electrode. Furthermore, along a second edge region of the multilayer film, the second carrier film, the second flat electrode situated between the second carrier film and the active layer, and the active layer are recessed such that the first protective film, the first carrier film, and the flat electrode situated between the first carrier film and the active layer protrude, with a further bus bar arranged on the protruding flat electrode.

The bus bar is electrically conductive and is usually arranged longitudinally along the relevant side of the multilayer film. It can, for example, be formed by an electrically conductive metal strip or an electrically conductive coating, e.g., a silver-containing print. Here, "metal" includes metal alloys. A strip of copper or a copper alloy is, for example, suitable. The bus bar implemented as a metal strip is usually connected to the flat electrode via an electrically conductive intermediate layer, e.g., a silver layer.

The at least two bus bars can both be arranged at one side of the functional element or each on a different side thereof. In a preferred embodiment, one bus bar is arranged in a side region of one side of the functional element; and the other bus bar, in the side region of the opposite side of the functional element. Said edge regions (first and second edge region) are thus arranged opposite one another. Accordingly, it is preferred that no bus bars are arranged on two sides, preferably opposite sides of the functional element.

In a preferred embodiment, one or two sealing films are arranged on each side of the multilayer film in each case, it being particularly preferred that two sealing films are attached at the side or sides of the multilayer film where no bus bar is arranged and one sealing film is attached at the side or sides of the multilayer film where a bus bar is arranged.

When a sealing film is attached on a side of the multilayer film where a bus bar is arranged, the sealing film is preferably applied between the carrier film recessed in the edge region and the associated protective film, i.e., relative to the active layer, on the side opposite the bus bars.

The one or more sealing films, selected from PET films and/or polyimide films, preferably PET films, preferably have, in each case independently, a thickness in the range from 0.02 mm to 0.2 mm, more preferably in the range from 0.04 mm to 0.15 mm. A typical thickness of the sealing films is, for example, 0.05 mm.

The length of the sealing film is the dimension along the side of the multilayer film on which the sealing film is attached. The width of the sealing film is accordingly transverse to the length or transverse to the side of the sealing film. The width of the part of the sealing film that is arranged between the protective film and the carrier film, is identified in FIG. 2 with BI; the width of the part of the sealing film that protrudes from the multilayer film, with BA.

The length of the sealing film can vary. The length of the sealing film can, for example, be less than the length of the side of the multilayer film. The length of the sealing film is preferably equal to or greater than the length of the side of the multilayer film on which the sealing film is attached, preferably longer such that it overlaps at both ends of the side of the multilayer film. The sealing film can, optionally, have recesses at one or more locations, for example, to be able to route electrical lines through.

The width of the part of the sealing film that is arranged between the protective film and the carrier film should enable sufficient fixing of the sealing film. The width of the part of the sealing film that protrudes from the multilayer film should suffice to enable covering of the side edge of the functional element not formed by the protective films. If two sealing films are arranged at one edge region or one side of the functional element, this applies to the sum of the widths of the parts of the two sealing films that protrude from the multilayer film. For reliable coverage, an allowance in the width must be taken into account since the sealing films do not necessarily cling smoothly to the side edge, instead, folds may result.

The sealing films are, for example, attached in each case to the multilayer film such that the part of the sealing film that is arranged between the protective film and the carrier film has a width BI in the range from 3 to 20 mm, preferably 4 to 15 mm; and/or the part of the sealing film that protrudes from the multilayer film has a width BA in the range from 5 to 30 mm, preferably 8 to 20 mm. The total width of the sealing film can, accordingly, be, for example, in the range from 8 to 50 mm, preferably 12 to 35 mm.

In addition to the films or layers mentioned, the multilayer film can also have further layers known per se, e.g., barrier layers, blocking layers, antireflective or reflective layers, and/or smoothing layers.

The invention further relates to a method for producing a composite pane with electrically controllable optical properties, comprising a) Providing a functional element according to the invention with electrically controllable optical properties as described above,
b) Forming an arrangement of an outer pane, the functional element, and an inner pane in this order,
c) Joining the outer pane and the inner pane by lamination, wherein, at least temporarily, a negative pressure or vacuum is applied to the arrangement, wherein bonding layers are formed by the first and second protective film of the functional element, and, if the functional element includes the one or more sealing films, a seal is formed by the one or more sealing films along at least one region of the circumferential side edge of the functional element.

In the context of the present invention, the term "sealing" means the sealing of the side edge in the region of the active layer of the functional element or in the region of the active layer, the flat electrodes, and the carrier films of the functional element, i.e., a sealing of the side edge of the functional element without protective films. "Sealing" does not refer to sealing the side edge in the region of the protective films of the functional element, but, instead, is intended, among other things, precisely to effect sealing of the functional element relative to the materials of the protective film.

In the installed functional element, the protective films are no longer part of the functional element, but form, in each case, a bonding layer to form the composite.

An inner pane and an outer pane are components of the composite pane to be produced. "Inner pane" refers to the pane facing the interior. "Outer pane" refers to the pane facing the external environment. The inner pane and the outer pane can be flat or curved panes. The inner pane and the outer pane can be made of the same material or of different materials.

The panes can be made of inorganic glass and/or organic glass (plastic). The inner pane and the outer pane can, for example, independently of one another, be made of flat glass, quartz glass, borosilicate glass, soda lime glass, aluminosilicate glass, polycarbonate, and/or polymethacrylate. The inner pane and the outer pane are preferably made of soda lime glass. The inner pane and the outer pane can, independently of one another, be clear or tinted.

The inner pane and the outer pane can have the same thickness or different thicknesses. Preferably, the inner pane and the outer pane have, independently of one another, a thickness in the range from 0.4 to 5.0 mm, e.g., 1 to 3 mm, more preferably 1.6 to 2.5 mm.

The inner pane and/or the outer pane can have further suitable coatings known per se, for example, nonstick coatings, tinting coatings, antireflective coatings, anti-scratch coatings, or low-E coatings. One example of coated glass is low-E glass (low emissivity glass).

In accordance with step a) of the method according to the invention, a (pre-assembly) functional element with electrically controllable optical properties according to the invention is provided. Providing the functional element in step a) can comprise cutting the functional element from a larger multilayer film of the functional element in the size and shape in which it is to be laminated into the composite pane. The cutting can, for example, be done mechanically, e.g., using a knife, or using a laser.

In a preferred embodiment of the method, a (pre-assembly) functional element according to the invention that includes the one or more sealing films which are attached to the multilayer film is provided.

In this case, provision of the (pre-assembly) functional element can also include attaching the one or more sealing films along an edge region of the multilayer film. This is done for each PET film or polyimide film used as a sealing film, preferably by peeling off the first or second protective film in the edge region of the functional element from the first or second carrier film, folding back the peeled-off protective film, inserting a part of the sealing film on the exposed carrier film, and placing the folded-back protective film on the inserted part of the sealing film. In this manner, a part of the sealing film is positioned or fixed along an edge region between the first protective film and the first carrier film or the second protective film and the second carrier film, while the other part protrudes from the multilayer film.

In step b), an arrangement of the outer pane, the functional element, and the inner pane is formed in this order. When arranging the layer stack, the functional element is preferably positioned such that it does not extend all the way to one of the side edges of the layer stack.

In step c), the outer pane and the inner pane are joined by lamination, wherein, at least temporarily, a negative pressure or vacuum is applied to the arrangement. During lamination, bonding layers are formed at least by the first and second protective film of the functional element, which layers effect a bond between the outer pane and the inner pane. The protective films are thus also bonding layers.

Lamination usually includes deaeration or evacuation with formation of a pre-composite and final lamination of the pre-composite with formation of the composite pane. The at least temporarily application of a negative pressure or vacuum to the arrangement can occur during deaeration and/or during final lamination, preferably during deaeration or evacuation. The strength of the negative pressure is arbitrary. For example, depending on the system, the negative pressure used during deaeration can differ. All negative pressures used in customary deaeration methods are suitable. By way of example, it is possible to operate at a pressure of −0.8 bar, however, higher or lower negative pressures are equally suitable.

Deaeration can be done according to the known methods, e.g., by a calender treatment or by a vacuum method, a vacuum method being preferred. In the vacuum method, a vacuum is applied to the arrangement, which has, for example, been placed in a vacuum bag or vacuum frame, and residual air is extracted from the fixed arrangement. During deaeration, heating of the arrangement also usually occurs. As mentioned, the protective films, in particular PVB-protective films, preferably have roughness on the side facing outward, as a result of which deaeration is simplified. Final lamination preferably is done under the action of heat and pressure or vacuum to obtain the finished composite pane. For lamination, methods known per se can be used, for example, autoclave methods, vacuum bag methods, vacuum ring methods, calender methods, vacuum laminators, or combinations thereof.

During final lamination, melting of the protective films usually occurs. Final lamination can be done, for example, at temperatures from 80° C. to 150° C., preferably 105° C. to 145° C., and an autoclave pressure of approx. 10 to 14 bar.

When the functional element includes one or more sealing films, during lamination of the arrangement, a seal is formed by the one or more sealing films along at least one region of the side edge of the functional element. Part of the sealing film that protrudes from the multilayer film, or when two sealing films are attached along the region of the side edge, the parts of the two sealing films that protrude from the multilayer film preferably cover the active layer, the flat electrodes, and the carrier films; or, when a bus bar is arranged in this region, the carrier layer, on which the sealing film is attached, the associated flat electrode, and the active layer all the way to the bus bar, as the result of which the side edge of the functional element is sealed in this region without the protective films, if appropriate, with the help of the bus bar. The resting positioning of the protruding parts of the sealing film on the side edge of the functional element is supported here in particular by the at least temporary application of a negative pressure or evacuation to the arrangement. The clamping of the sealing film between the carrier film and the PVB initially suffices for positioning; it is then fixed, pressed, and deaerated by the evacuation.

The protruding parts of the sealing film can rest flat or folded at the side edge toward the active layer to form the seal. The folds can be irregular. In particular, in the case of two sealing films in the edge region, folded shapes can result, wherein the protruding parts of the two sealing films come into contact. In edge regions, where a bus bar is arranged and a sealing film is used, the protruding part of the sealing film generally lies against the side edge such that it comes into contact with the bus bar and partially covers it. The bus bar thus becomes, so to speak, part of the seal. As already mentioned, possible folds must be taken into account when dimensioning the sealing film, in particular the width of the protruding part, in order to ensure sealing in this region.

In the variant in which the functional element includes the one or more sealing films, during lamination, a seal is formed by the sealing film(s) along at least one region of the circumferential side edge of the functional element. In this region, the functional element has, disregarding the protective film, no open side edge to the protective film, instead, the active layer is surrounded by the material of the sealing film. The active layer is thus effectively isolated from the material of the protective film and, if present, other bonding layers such that no diffusion can occur between this material and the active layer and degradation of the active layer is prevented. Compared to the sealing of the side edge by an additional applied component, e.g., a polymeric tape, the solution according to the invention is simpler in design and visually inconspicuous such that the composite pane is more pleasing aesthetically. Masking of the side edge of the functional element can be dispensed with.

The region of the side edge of the functional element sealed according to the invention without the protective films, in particular in the region of the active layer, can include the entire circumferential side edge, optionally with the exception of any locations where an electrical conductor for the electrical contacting of the flat electrodes is routed out of the functional element via the side edge. The region of the side edge of the functional element sealed according to the invention without the protective films, in particular in the region of the active layer, can, however, include only a part of the circumferential side edge, e.g., a region of the side edge that is visible in the composite pane and/or is not covered by other measures.

In accordance with the method according to the invention, a composite pane with the functional element can be obtained, wherein the circumferential side edge of the functional element without the protective films, is, optionally, at least partially sealed. As a rule, however, it is further expedient to additionally seal the side edge of the composite pane, in particular if the functional element does not extend all the way to side edges of the composite pane. Such additional sealing is preferably carried out in the context of the method according to the invention.

In a preferred embodiment of the method according to the invention, the formation of the arrangement consequently further includes according to step b), the arrangement of at least one frame-like thermoplastic bonding film between the outer pane and the inner pane and the insertion of the functional element into the cutout of the at least one frame-like thermoplastic bonding film, and/or the arrangement at least one thermoplastic bonding film between the outer pane and the functional element, and/or the arrangement of at least one thermoplastic bonding film between the inner pane and the functional element.

In this embodiment, during lamination, a thermoplastic intermediate layer with an embedded functional element is preferably formed from the first protective film, the second protective film, and the at least one frame-like thermoplastic bonding film and/or the at least one thermoplastic bonding film. The functional element is thus advantageously embedded in an intermediate layer, without having contact with the surrounding atmosphere.

The arrangement at least one frame-like thermoplastic bonding film between the outer pane and the inner pane and the insertion of the functional element into the cutout of the at least one frame-like thermoplastic bonding film is particularly preferred. One or more, e.g., two, superimposed frame-like thermoplastic bonding films can be used. The use of more than one frame-like thermoplastic bonding film can be useful to match the total thickness of the frame-like thermoplastic bonding films to the thickness of the functional element (including the protective film) and/or to simplify the arrangement of the components.

The use of such frame-like thermoplastic bonding film is known in the art. They have the shape of a picture frame. The functional element is inserted as precisely as possible into the cutout such that it is surrounded circumferentially by the thermoplastic bonding film. The at least one frame-like thermoplastic bonding film expediently compensates approx. the thickness of the functional element in the regions around the functional element such that a mechanically and visually improved composite pane is produced.

The thermoplastic bonding film that can optionally be arranged between a pane and the functional element can be conventional, non-frame-like films.

If used, the frame-like thermoplastic bonding film and/or the non-frame-like thermoplastic bonding film serves to bond the two panes, as is customary with composite panes. They thus serve the same purpose as the protective films of the functional element and advantageously form, together with the protective film, an intermediate layer in which the rest of the functional element is embedded.

In the following, the information about thermoplastic bonding films refers to both frame-like and non-frame-like thermoplastic bonding films, unless otherwise indicated. For the thermoplastic bonding films, the same films that were previously described for the protective films can be used, e.g., polyvinyl butyral (PVB) films, ethylene vinyl acetate (EVA) films, or thermoplastic polyurethane (TPU) films, with PVB films being preferred. Reference is made to the above description in connection with the protective films with respect to the components contained.

It is preferred for the thermoplastic bonding films used to contain the same thermoplastic polymer that is also contained in the protective films, in particular PVB. The thermoplastic bonding films can contain further components as described above, in particular a plasticizer. The thermoplastic bonding film can be plasticizer-free or plasticizer-containing, with a plasticizer-containing thermoplastic bonding film being preferred. Examples of plasticizers include aliphatic diesters of tri- or tetraethylene glycol, e.g., triethylene glycol-(2-ethylhexanoate). The thermoplastic bonding film is preferably a plasticizer-containing PVB film, e.g., with a plasticizer content of at least 15 wt.-%.

With regard to the thickness of the thermoplastic bonding film, the information that has been given for the protective film applies, although it should be noted for the at least one frame-like thermoplastic bonding film that its thickness or overall thickness should correspond roughly to the thickness of the functional element (including protective film). Accordingly, the thermoplastic bonding film can, for example, have a thickness in the range from 0.03 mm to 0.9 mm, preferably from 0.3 mm to 0.6 mm, preferably being PVB films.

With the method according to the invention, it is possible to incorporate, in addition to the functional element, one or more additional functional layers between the inner pane and the outer pane. Examples are acoustic films, absorption films, and IR reflective films for the layers formed therefrom. As usual, IR is an abbreviation for infrared. When further functional layers are to be accommodated in the composite pane, the corresponding functional films are preferably arranged between two bonding films or between a bonding film and a protective film of the functional element.

For electrical contacting, electrical cables are usually connected to the flat electrodes or bus bars of the functional element and routed out of the arrangement via the side edge. Such a connection of the cables is made prior to the lamination of the composite pane.

Also shown is a composite pane with electrically controllable optical properties, comprising an outer pane, an inner pane, and a functional element according to the invention with electrically controllable optical properties arranged between the outer pane and the inner pane, wherein the first protective film and the second protective film of the functional element form bonding layers. The bonding layers formed by the protective films bond the inner pane and the outer pane, without requiring additional thermoplastic bonding layers.

If the functional element according to the preferred embodiment includes the one or more sealing films, a seal is formed by the one or more sealing films along at least one region of the circumferential side edge of the functional element. Preferably, essentially the entire circumferential side edge of the functional element is sealed by the sealing films without the protective films, in particular in the region of the active layer.

As already mentioned, the information above concerning the functional element according to the invention and the method according to the invention applies analogously to the composite pane; therefore, reference is made thereto.

The invention further relates to the use of the functional elements according to the invention with electrically controllable optical properties in a composite pane, for example, as a window pane of buildings, of spaces in the interior of buildings, or of vehicles, in particular as a rear window, side window, windshield, or roof panel of motor vehicles, such as passenger cars, or transport vehicles, such as buses, trains and watercraft.

The invention is explained in detail in the following with the help of exemplary embodiments and accompanying figures, which are intended in no way to restrict the invention. The accompanying figures are schematic representations and are not to scale.

They depict.

Figure 1:
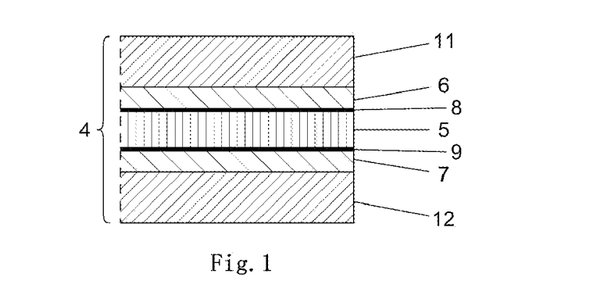
FIG. 1 a detail of a functional element according to the invention with electrically controllable optical properties, in cross-section, FIG. 2 a detail of another functional element according to the invention with attached sealing films, in cross-section, FIG. 3 the functional element according to the invention of FIG. 2, in the installed state, FIG. 4 a detail of a composite glass pane according to the invention with sealing in the region of the side edge of the functional element, in cross-section FIG. 5 a detail of a functional element according to the invention with arranged bus bar, in cross-section, FIG. 6 the functional element of FIG. 5 with attached sealing film, in the installed state, FIG. 7 a plan view of an arrangement for a composite pane according to the invention with attached sealing films, FIG. 8 an exemplary embodiment of the method according to the invention using a flowchart.

FIG. 1 depicts a detail of the (pre-assembly) functional element according to the invention with electrically controllable optical properties, in cross-section. the detail depicts a side end of the functional element. The functional element is implemented in the form of a multilayer film 4. The functional element is a PDLC functional element. The multilayer film 4 is formed, in this order, from a first protective film 11, a first carrier film 6, a first flat electrode 8, an active layer 5, a second flat electrode 9, a second carrier film 7, and a second protective film 12.

The first and second protective film 11, 12 are, in each case, PVB films that have a thickness of 0.38 mm. Preferably, they are plasticizer-free PVB films. The PVB films can, independently of one another, be clear or tinted. The first and second carrier film 6, 7 are PET films and have, for example, a thickness of approx. 0.18 mm. The active layer 5 contains a polymer matrix with liquid crystals dispersed therein, which align themselves as a function of the electric voltage applied, by which means the optical properties are adjustable. The carrier films 6, 7 are provided with an electrically conductive coating facing the active layer 5, e.g., made of ITO with a thickness of approx. 100 nm, which form the flat electrodes 8, 9. The thickness of the multilayer film without the two protective films is approx. 0.4 mm.

Figure 2:
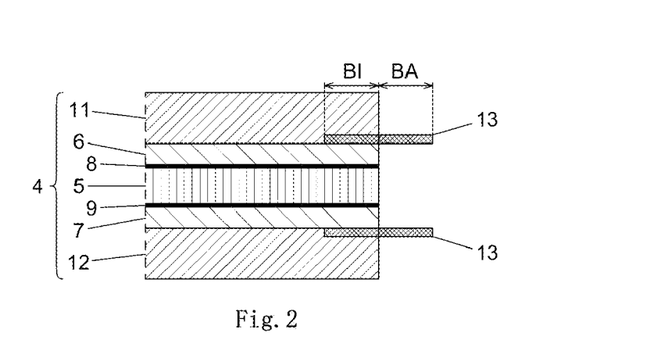

FIG. 2 depicts the functional element of FIG. 1, in which two sealing films 13 are attached at an edge region of the multilayer film. The sealing films 13 are PET films that have a thickness of 0.05 mm. One part of a sealing film 13 is arranged between the first protective film 11 and the first carrier film 6. The other part of this sealing film 13 protrudes from the multilayer film. The width of the part of the sealing film 13 between the first protective film 11 and the first carrier film 6 is identified in the figure as "BI". The width of the other part of the sealing film 13, which protrudes from the multilayer film, is identified in the figure as "BA". Correspondingly, a part of the other sealing film 13 is arranged between the second protective film 12 and the second carrier film 7. The other part of the sealing film 13 protrudes from the multilayer film 4. The width of the part of the sealing film 13 between the protective film and the carrier film (width BI) can, for example, be in the range from 3 to 20 mm, preferably 4 to 15 mm. The width of the part (width BA) protruding from the multilayer film 4 can, for example, be in the range from 5 to 30 mm, preferably 8 to 20 mm.

As mentioned, the figures are schematic. For better illustration, FIG. 2 depicts the sealing films 13 as fully self-supporting films. This is not necessarily the case, i.e., the protruding parts of the sealing films 13 can actually hang down, at least partially.

For a better overview, FIG. 2 depicts the principle of attaching the sealing films 13 on only one side of the multilayer film 4. In the preferred embodiments, one or two sealing films 13 are attached to all sides of the multilayer film 4.

Figure 3:
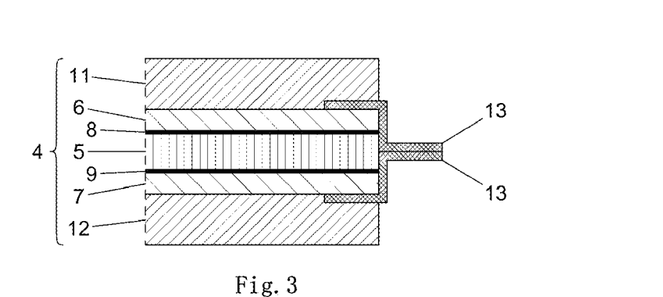

FIG. 3 depicts the functional element of FIG. 2, as installed in a composite pane. The remaining components of the composite pane are not shown. The two protruding parts of the two sealing films 13 jointly cover the side edge of the multilayer film 4 without the protective films 11, 12 and form a seal. The depiction of the overlap is purely schematic. The manner of the folding together of the protruding parts of the two sealing films 13 can be more irregular. In particular, the two regions of the sealing films 13 that are in contact are generally not upright as shown, but are, for example, folded over in any shape on the regions of the sealing film covering the side edge.

Figure 4:
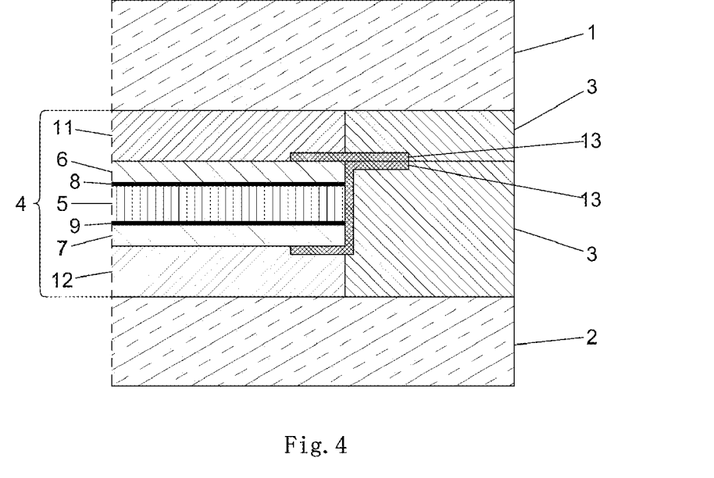

FIG. 4 depicts a detail of a composite glass pane according to the invention that is, for example, suitable as a roof panel with sealing of the side edge of the functional element without protective films, in cross-section. The detail depicts a side end of the composite pane. The composite pane includes a built-in functional element 4 that corresponds to the functional element depicted in FIGS. 2 and 3. For the description of the components of the functional element, reference is made to these figures.

The composite pane comprises an outer pane 1 and an inner pane 2. The outer pane 1 and the inner pane 2 are made of soda lime glass. The outer pane 1 and the inner pane 2 have, in each case, a thickness of 2.1 mm. In another possible embodiment, the outer pane 1 can have, for example, a thickness of 2.1 mm; and the inner pane 2, for example, a thickness of 1.6 mm. The multilayer film 4 of the functional element is inserted into two frame-like bonding films 3 stacked on one another. Of the two frame-like bonding films 3, only the part at the side end of the composite pane is visible in the detail depicted in cross-section. The arrangement on the opposite side (not shown) of the composite pane is a mirror image. The two frame-like bonding films 3 have a cutout into which the PDLC multilayer film 4 can be inserted with a substantially precise fit. The two frame-like bonding films 3 thus form, so to speak, a sort of passe-partout for the functional element.

Both frame-like bonding films 3 are PVB films that contain a plasticizer. One frame-like bonding film 3 has a thickness of 0.76 mm. The other frame-like bonding film 3 has a thickness of 0.38 mm. The total thickness of the two frame-like bonding films 3 corresponds approx. to the thickness of the functional element 4 including protective films 11, 12. After lamination, the two frame-like bonding films 3 and the protective films 11, 12 of the functional element form, together, a thermoplastic intermediate layer in which the functional element is embedded. The thermoplastic intermediate layer formed also joins the outer pane 1 to the inner pane 2.

The two sealing films 13 attached to the multilayer film 4 cover, with their protruding parts, the side edge of the functional element 4 without protective film 11, 12, thus forming a seal. FIG. 4 depicts, in contrast to FIG. 3, a different conceivable manner of folding the protruding parts of the sealing film. This also is schematic: the result is usually a more irregular fold.

A margin of 4 mm is expedient to achieve a reliable seal, which is well achieved by the functional element according to the invention or the method according to the invention, in particular when two PET films are attached to the side of the multilayer film as a sealing film.

No air inclusions are observed after lamination. The material in the edge region can form waves during edge sealing, however, as a result of the deaeration, no optical defects were detectable even after accelerated aging (30 days at 90° C.).

For laminated panes, a so-called "bake test" is customary, in which the laminated pane is stored for 2 hours at 120° C. Air bubbles are detectable in inferior panes. This test was also passed by the composite panes according to the invention with the corresponding seal.

Figure 5:
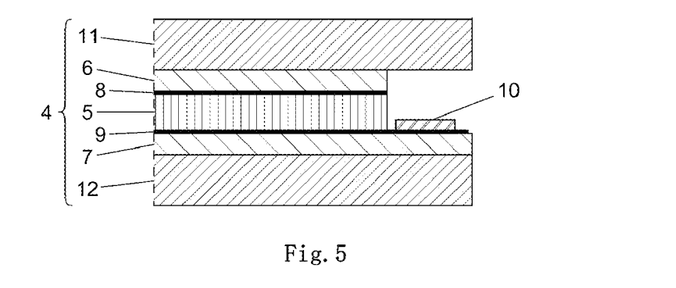

FIG. 5 depicts a detail of a functional element according to the invention in cross-section, on which a bus bar is arranged. The detail depicts a side end of the multilayer film 4. Apart from the arrangement of the bus bar 10, the functional element corresponds to the functional element depicted in FIG. 1. For the description of the components of the functional element, reference is made to FIG. 1.

Along the edge region of the depicted side of the multilayer film 4, the first carrier film 6, the flat electrode 8, and the active layer 5 are recessed such that the second protective film 12, the second carrier film 7, and the flat electrode 9 protrude. Arranged on the protruding flat electrode 9 is a bus bar 10 that can be formed, for example, from a copper strip or a silver-containing print.

At least one additional bus bar is generally arranged on the multilayer film, which is not shown in FIG. 5. For this, the second carrier film, the flat electrode situated between the second carrier film and the active layer, and the active layer are recessed along another edge region of the multilayer film such that the first protective film, the first carrier film, and the flat electrode situated between the first carrier film and the active layer protrude. The additional bus bar is arranged on the protruding flat electrode.

Figure 6:
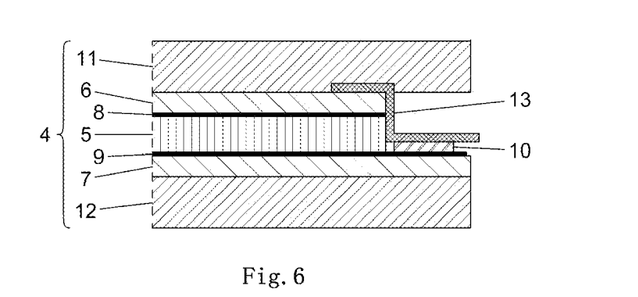

FIG. 6 depicts the functional element of FIG. 5, on which a sealing film 13 is attached. Along the edge region of the side, a part of the sealing film 13 is arranged between the first protective film 11 and the first carrier film 6. The other part of the sealing film 13 protrudes from the multilayer film 4. FIG. 6 depicts a possible positioning of the protruding part of the sealing film 13 in the installed state, the remaining components of the composite pane are not depicted, for reasons of clarity. The side edge of the active layer 5 is covered by the sealing film 13 in combination with the bus bar 10, which is in contact with the sealing film, by which means a seal is formed. The bus bar 10 can be connected to the on-board electrical system via connecting cables (not shown).

Figure 7:
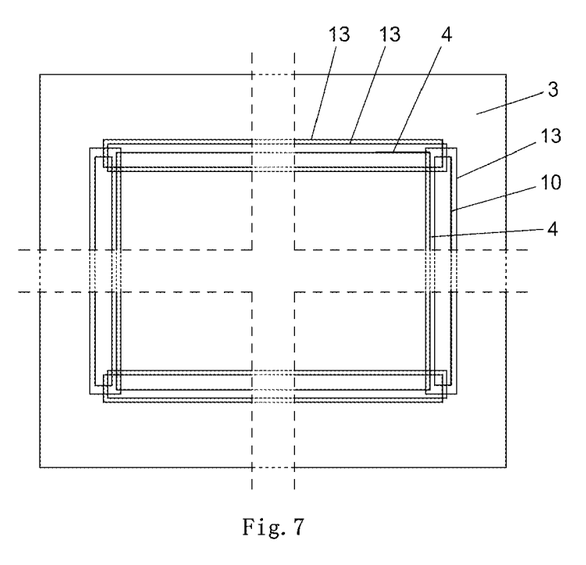
Figure 8:
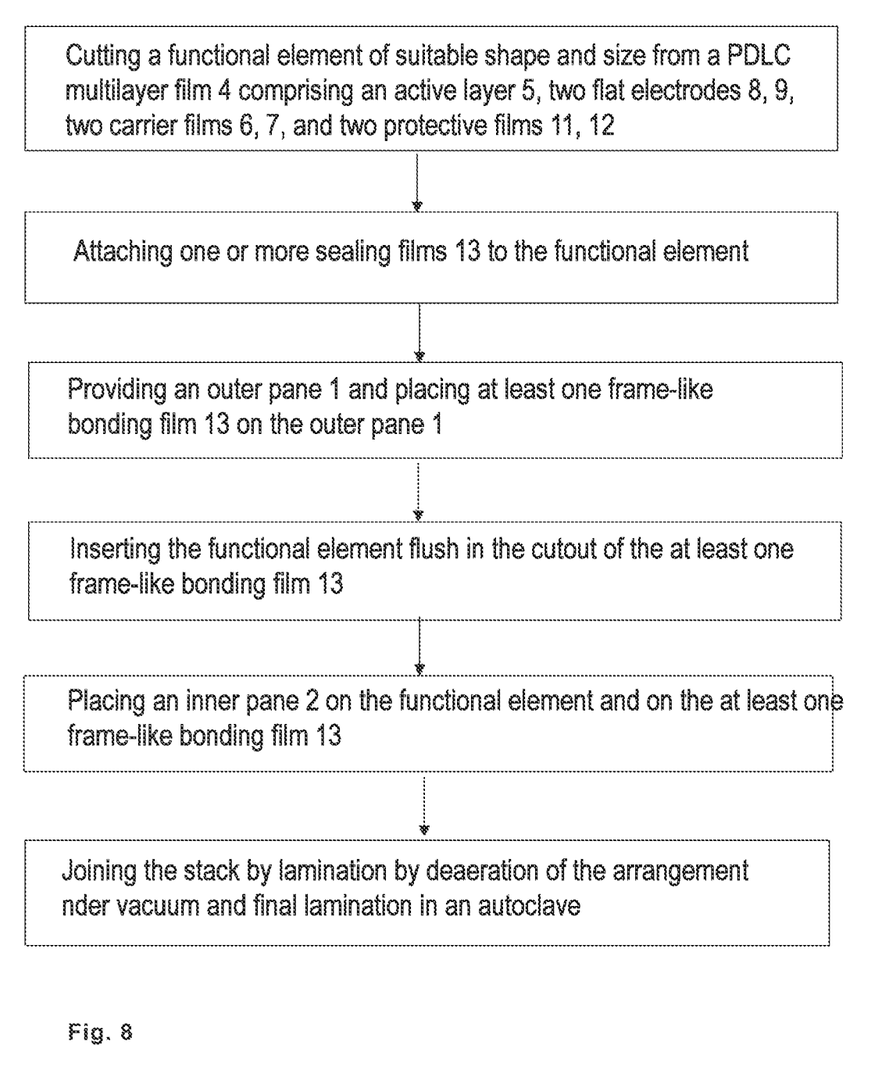

FIG. 7 depicts a plan view of an arrangement for a composite pane with attached sealing films for a sliding roof of a vehicle, with the inner pane and the outer pane omitted for clarity. The depiction shows details of the arrangement at the four side corners. The arrangement of FIG. 7 depicts the arrangement prior to lamination.

The frame-like bonding film 3 depicted in plan view in FIG. 7 corresponds to the two superimposed frame-like bonding films (two PVB films with thicknesses of 0.76 mm or 0.38 mm), depicted in FIG. 4 in detail in cross-section. A PDLC multilayer film 4 corresponding to FIG. 1 is inserted into the cutout of the frame-like bonding film 3.

Arranged in each case on the right and the left side of the multilayer film 4 is a bus bar 10, as described for FIG. 5. A sealing film 13 (PET film, 0.05 mm thick) is also attached in each case to the multilayer film 4 on the right and left side of the multilayer film 4 in the manner described (e.g., FIG. 6). Two sealing films 13 (PET film, 0.05 mm thick) are also situated, in each case, on the upper and lower side of the multilayer film 4, which are attached in the manner described (e.g., FIG. 2) to the multilayer film 4.

The length of the sealing films 13 is in each case greater than the length of the side of the multilayer film 4 to which they are attached such that the sealing films 13 slightly overlap the two ends of the respective side. In this embodiment, after lamination has been completed, essentially the entire circumferential side edge of the multilayer film 4 without protective film is sealed by the sealing films 13. The seal can, optionally, be interrupted for required electrical connections (not shown). A visually inconspicuous seal can thus be obtained in a simple manner.

LIST OF REFERENCE CHARACTERS 1 outer pane
2 inner pane
3 frame-like thermoplastic bonding film or bonding layer
4 multilayer film or functional element with electrically controllable optical properties
5 active layer
6 first carrier film
7 second carrier film
8 first flat electrode
9 second flat electrode
10 bus bar
11 first protective film
12 second protective film
13 seal or sealing film
BI width of the part of the sealing film that is arranged between the protective film and the carrier film
BA width of the part of the sealing film that protrudes from the multilayer film (4)

The invention claimed is:

1. A pre-assembly functional element to be incorporated into a composite pane with electrically controllable optical properties, comprising a multilayer film, which comprises, in this order, a first protective film, a first carrier film, a first flat electrode, an active layer, a second flat electrode, a second carrier film, and a second protective film, wherein the first protective film and the second protective film are in each case independently selected from a polyvinyl butyral (PVB) film, an ethylene vinyl acetate (EVA) film, or a thermoplastic polyurethane (TPU) film, and wherein the pre-assembly functional element is constructed as a laminated multilayer film before incorporation into the composite pane such that the multilayer film is a laminated film in which the first protective film, the first carrier film, the first flat electrode, the active layer, the second flat electrode, the second carrier film and the second protective film are bonded to each other to form a pre-fabricated element in which a main surface of the first protective film and a main surface of the second protective film form outer free surfaces of the pre-assembly functional element.

2. The pre-assembly functional element according to claim 1, further comprising one or more sealing films, which are in each case independently selected from a polyethylene terephthalate (PET) film or a polyimide film, wherein each sealing film is attached to the multilayer film, wherein one part of the sealing film is arranged along an edge region of the multilayer film between the first protective film and the first carrier film or between the second protective film and the second carrier film and the other part of the sealing film protrudes from the multilayer film.

3. The pre-assembly functional element according to claim 2, wherein in each case, two sealing films are attached to one or more sides of the multilayer film, wherein, along an edge region of the respective side, a part of the one sealing film is arranged between the first protective film and the first carrier film and the other part of the sealing film protrudes from the multilayer film and a part of the other sealing film is arranged between the second protective film and the second carrier film and the other part of the sealing film protrudes from the multilayer film.

4. The pre-assembly functional element according to claim 2, wherein the one or more sealing films are in each case attached to the multilayer film such that the part of the sealing film that is arranged between the protective film and the carrier film has a width in the range from 3 to 20 mm and/or the part of the sealing film that protrudes from the multilayer film has a width in the range from 5 to 30 mm.

5. The pre-assembly functional element according to claim 4, wherein the part of the sealing film that is arranged between the protective film and the carrier film has a width in the range from 4 to 15 mm and/or the part of the sealing film that protrudes from the multilayer film has a width in the range from 8 to 20 mm.

6. The pre-assembly functional element according to claim 1, further comprising at least two bus bars, which are arranged along a first edge region and a second edge region of the multilayer film.

7. The pre-assembly functional element according to claim 6, wherein in each case, one or two sealing films are attached to each side of the multilayer film, wherein two sealing films are attached to the side or sides of the multilayer film where no bus bar is arranged and one sealing film is attached to the side or sides of the multilayer film where a bus bar is arranged.

8. The pre-assembly functional element according to claim 1, wherein the functional element is a PDLC functional element, a PNLC functional element, or an SPD functional element.

9. The pre-assembly functional element according to claim 1, wherein
the first protective film and/or the second protective film is a PVB film that is free of plasticizer, and/or
the first carrier film and the second carrier film is in each case a polyethylene terephthalate (PET) film.

10. The pre-assembly functional element according to claim 1, wherein the first protective film and/or the second protective film are in each case independently selected from a clear film, a tinted film, and an acoustic film.

11. The pre-assembly functional element according to claim 10, wherein each of the first and second protective films is a PVB film.

12. The pre-assembly functional element according to claim 1, wherein
the first and second protective film have in each case, independently, a thickness in the range from 0.03 mm to 0.9 mm, and/or
the first and second carrier film have in each case, independently, a thickness in the range from 0.03 mm to 0.4 mm, and/or
the one or more sealing films have in each case, independently, a thickness in the range from 0.02 mm to 0.2 mm.

13. The pre-assembly functional element according to claim 12, wherein
the first and second carrier film have in each case, independently, a thickness in the range from 0.04 mm to 0.2 mm, and/or
the one or more sealing films have in each case, independently, a thickness in the range from 0.04 mm to 0.15 mm.

14. A method for producing a composite pane with electrically controllable optical properties, comprising
a) providing a pre-assembly functional element with electrically controllable optical properties according to claim 1,
b) forming an arrangement of an outer pane, the functional element, and an inner pane in this order,
c) joining the outer pane and the inner pane by lamination, wherein, at least temporarily, a negative pressure is applied to the arrangement, wherein the outer pane and the inner pane are joined by the first and second protective film of the functional element; and, if the functional element includes one or more sealing films, a seal is formed by the one or more sealing films along at least one region of the circumferential side edge of the functional element.

15. The method according to claim 14, wherein in forming the arrangement at step b), at least one frame-like thermoplastic bonding film is arranged between the outer pane and the inner pane, and the functional element is inserted into the cutout of the at least one frame-like thermoplastic bonding film; and/or
at least one thermoplastic bonding film is arranged between the outer pane and the functional element, and/or at least one thermoplastic bonding film is arranged between the inner pane and the functional element.

16. The method according to claim 15, wherein, during lamination, an intermediate layer with an embedded functional element is formed from the first protective film, the second protective film, and the at least one frame-like thermoplastic bonding film and/or the at least one thermoplastic bonding film.

17. A method comprising utilizing a functional element with electrically controllable optical properties according to claim 1 in a composite pane.

18. The method according to claim 17, wherein the composite pane is a window pane of buildings, of spaces in the interior of buildings or of vehicles.

19. The method according to claim 18, wherein the window pane is a rear window, a side window, a windshield, or a roof panel of a motor vehicle.

20. The method according to claim 19, wherein the motor vehicle is a passenger car, a bus, a train, or a watercraft.

21. The pre-assembly functional element according to claim 1, wherein the pre-assembly functional element has a surface area between 100 cm$^2$ and 20 m$^2$.

22. The pre-assembly functional element according to claim 1, wherein the first carrier film is in contact with the first protective film, and the second carrier film is in contact with the second protective film.

* * * * *